United States Patent [19]

Feher

[11] Patent Number: 5,528,851

[45] Date of Patent: Jun. 25, 1996

[54] FISHING LINE BOBBER

[76] Inventor: John Feher, R.D. 1, Box 222A, Adena, Ohio 43901

[21] Appl. No.: 418,408

[22] Filed: Apr. 7, 1995

[51] Int. Cl.$^6$ .................................................. A01K 93/00
[52] U.S. Cl. .............................. 43/43.1; 43/44.87; 441/28
[58] Field of Search .................................. 43/43.1, 44.87, 43/44.91; 441/28; D10/107; D22/146

[56] References Cited

U.S. PATENT DOCUMENTS

| | | | |
|---|---|---|---|
| 2,531,806 | 11/1950 | Coughlin | 43/44.91 |
| 3,568,228 | 3/1971 | Rudelick | 441/28 |
| 3,829,919 | 8/1974 | Mathae | 441/28 |
| 3,916,467 | 11/1975 | Curd, Jr. | 441/28 |
| 4,530,181 | 7/1985 | Ender | 43/44.88 |

*Primary Examiner*—J. Elpel

[57] ABSTRACT

A bobber for supporting a fishing line within a body of water. The inventive device includes a spherical floatation member having a hollow hemi-spherical weight secured to a lower end of the floatation member. A swivel and line clasp extend from a center of the weight for coupling to a fishing line to support the line within water.

7 Claims, 3 Drawing Sheets

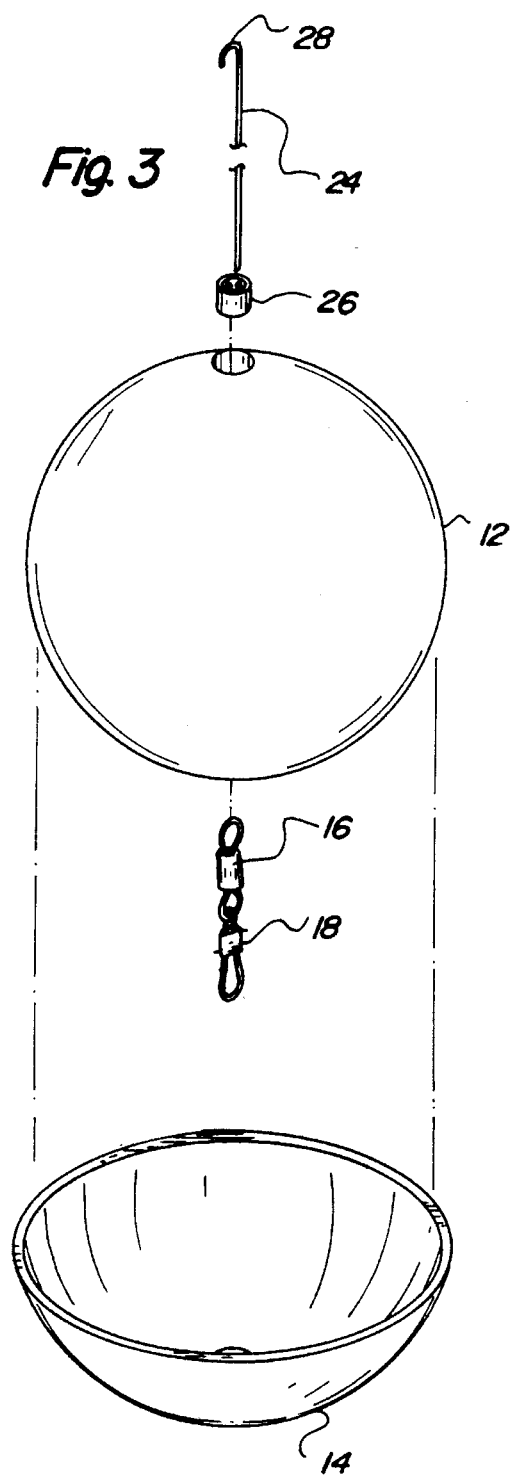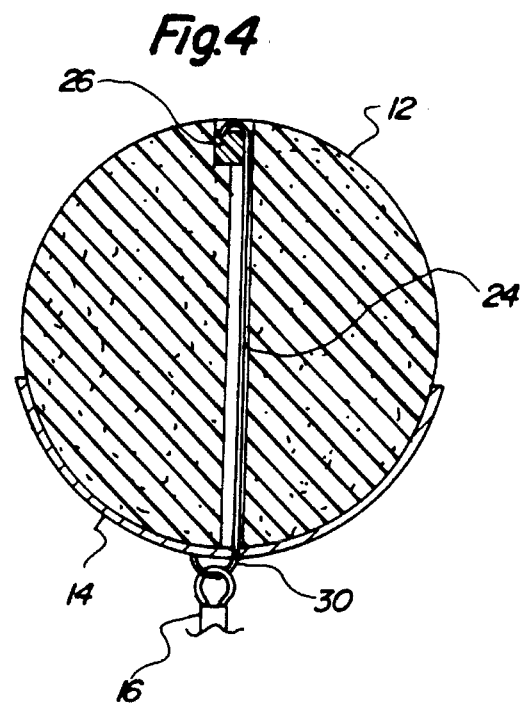

FISHING LINE BOBBER

BACKGROUND OF THE INVENTION

1. Field of the Invention

The present invention relates to fishing float structures and more particularly pertains to a fishing line bobber for supporting a fishing line within a body of water.

2. Description of the Prior Art

The use of fishing float structures is known in the prior art. More specifically, fishing float structures heretofore devised and utilized are known to consist basically of familiar, expected and obvious structural configurations, notwithstanding the myriad of designs encompassed by the crowded prior art which have been developed for the fulfillment of countless objectives and requirements.

While the prior art fishing float structures fulfill their respective, particular objectives and requirements, the prior art does not disclose a fishing line bobber for supporting a fishing line within a body of water which includes a spherical floatation member having a hollow hemi-spherical weight secured to a lower end thereof, and a swivel and line clasp extending from a center of the weight for coupling to a fishing line to support the line within water.

In these respects, the fishing line bobber according to the present invention substantially departs from the conventional concepts and designs of the prior art, and in so doing provides an apparatus primarily developed for the purpose of supporting a fishing line within a body of water.

SUMMARY OF THE INVENTION

In view of the foregoing disadvantages inherent in the known types of fishing float structures now present in the prior art, the present invention provides a new fishing line bobber construction wherein the same can be utilized for supporting a fishing line within a body of water. As such, the general purpose of the present invention, which will be described subsequently in greater detail, is to provide a new fishing line bobber apparatus and method which has many of the advantages of the fishing float structures mentioned heretofore and many novel features that result in a fishing line bobber which is not anticipated, rendered obvious, suggested, or even implied by any of the prior art fishing float structures, either alone or in any combination thereof.

To attain this, the present invention generally comprises a bobber for supporting a fishing line within a body of water. The inventive device includes a spherical floatation member having a hollow hemi-spherical weight secured to a lower end of the floatation member. A swivel and line clasp extend from a center of the weight for coupling to a fishing line to support the line within water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing line bobber apparatus and method which has many of the advantages of the fishing float structures mentioned heretofore and many novel features that result in a fishing line bobber which is not anticipated, rendered obvious, suggested, or even implied by any of the prior art fishing float structures, either alone or in any combination thereof.

It is another object of the present invention to provide a new fishing line bobber which may be easily and efficiently manufactured and marketed.

It is a further object of the present invention to provide a new fishing line bobber which is of a durable and reliable construction.

An even further object of the present invention is to provide a new fishing line bobber which is susceptible of a low cost of manufacture with regard to both materials and labor, and which accordingly is then susceptible of low prices of sale to the consuming public, thereby making such fishing line bobbers economically available to the buying public.

Still yet another object of the present invention is to provide a new fishing line bobber which provides in the apparatuses and methods of the prior art some of the advantages thereof, while simultaneously overcoming some of the disadvantages normally associated therewith.

Still another object of the present invention is to provide a new fishing line bobber for supporting a fishing line within a body of water.

Yet another object of the present invention is to provide a new fishing line bobber which includes a spherical floatation member having a hollow hemi-spherical weight secured to a lower end thereof, and a swivel and line clasp extending from a center of the weight for coupling to a fishing line to support the line within water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded isometric illustration of the present invention.

FIG. 4 is a cross-sectional view of the invention.

DESCRIPTION OF THE PREFERRED EMBODIMENT

Figure 1:
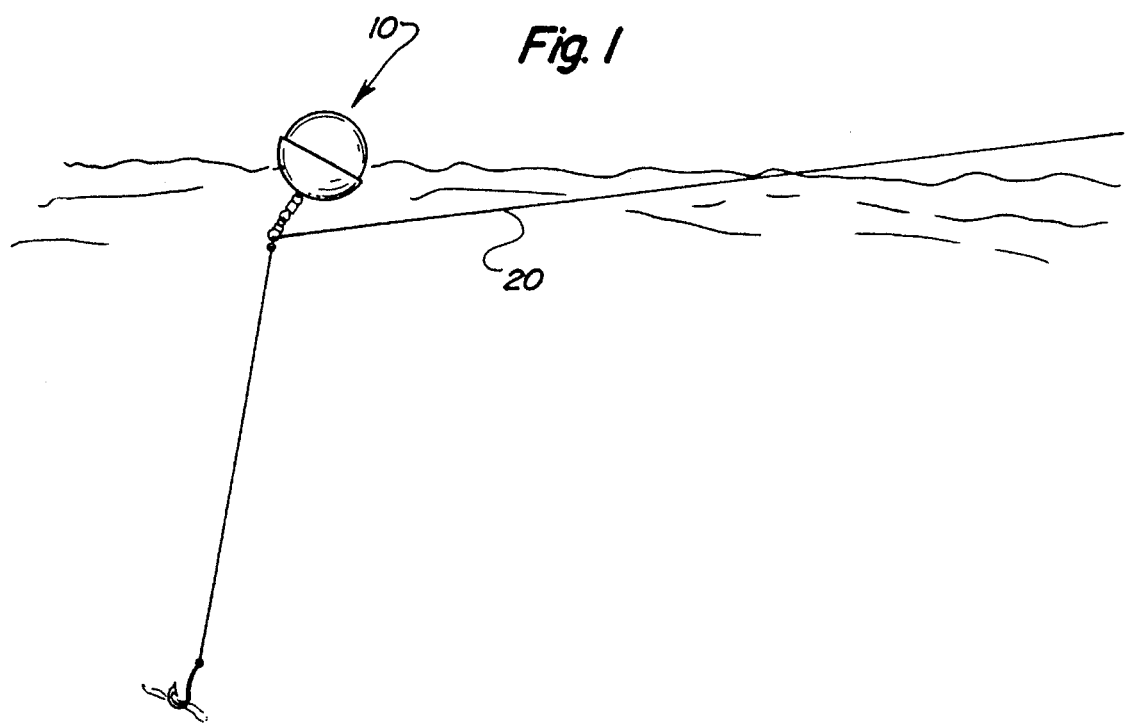
FIG. 1 is an elevation view of a fishing line bobber according to the present invention in use.

With reference now to the drawings, and in particular to FIGS. 1–6 thereof, a new fishing line bobber embodying the principles and concepts of the present invention and generally designated by the reference numeral 10 will be described.

More specifically, it will be noted that the fishing line bobber 10 comprises a spherical floatation member 12 preferably formed of a substantially polymeric foam material such as is commonly known by the trademark name "STYROFOAM". A hollow hemi-spherical weight 14 is secured to a portion of the spherical floatation member 12 so as to coextensively cover approximately one-half of -the spherical floatation member. A swivel 16 is pivotally mounted to a center of the hollow hemi-spherical weight 14 and extends therefrom. A line clasp 18 is secured to the swivel 16 and is adapted for engaging a fishing line 20 of an unillustrated fishing rig. If desired, a limiting means 22 can be provided with the present invention 10 for securing to the fishing line 20 so as to limit travelling of the line clasp 18 along the fishing line in a first direction. By this structure, a fishing line 20 can be supported within a body of water as illustrated in FIG. 1.

Figure 2:
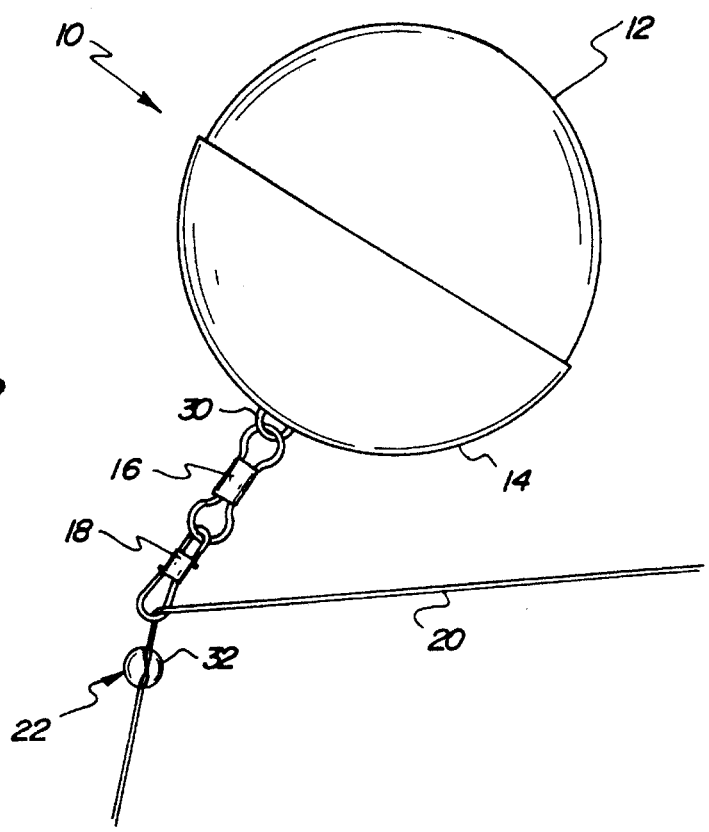
FIG. 2 is an enlarged elevation view of the invention.

Referring now to FIGS. 2 through 4 wherein the present invention is illustrated in detail, it can be shown that a center wire 24 extends through a center of the spherical floatation member 12 and is coupled to diametrically opposed ends thereof. To this end, a securing boss 26 is received within a cylindrical bore having a first diameter directed into an upper end of the spherical floatation member 12. The center wire 24 projects through the securing boss 26 and through a cylindrical bore extending through the spherical floatation member 12 which is of a second diameter substantially less than the first diameter of the cylindrical bore into which the securing boss 26 is positioned as shown in FIG. 4 of the drawings. The center wire 24 is shaped so as to define an upper J-shaped end 28 which engages a portion of the sectoring boss 26 so as to preclude a passage of a first upper end of the center wire 24 through the cylindrical bores of the spherical floatation member 12. The center wire 24 continues through the cylindrical bore of the spherical floatation member 12 and projects through an unlabelled aperture extending through a center of the hemi-spherical weight 14. The center wire 24 is then formed into a lower J-shaped end 30 which engages an exterior portion of the hemi-spherical weight 14 so as to secure the weight relative to the spherical floatation member 12. If desired, an adhesive can be interposed between the hemi-spherical weight 14 and the spherical floatation member 12 so as to further secure the weight relative thereto. Further, it is desirable for a suitable sealant or putty material to be positioned within the cylindrical bores of the spherical floatation member so as to preclude an entrance of water into the cylindrical bores. As shown in FIG. 4, the swivel 16 is engaged to the lower J-shaped end 30 of the center wire 24 so as to secure the same relative to the spherical floatation member 12.

Figure 5:
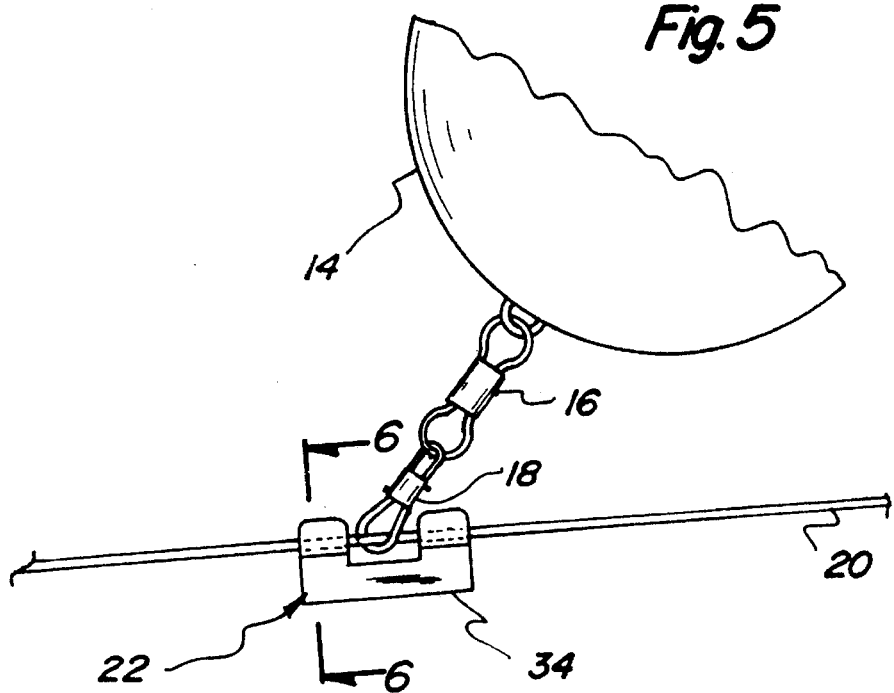
FIG. 5 is an enlarged elevation view of an alternative form of a limiting means of the present invention.
Figure 6:
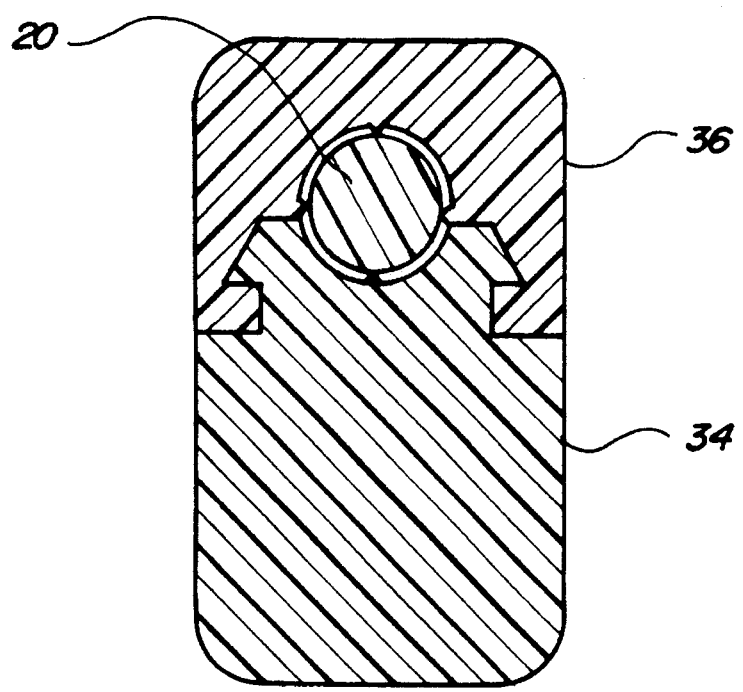
FIG. 6 is a cross-sectional view taken along line 6—6 of FIG. 5.

As shown in FIG. 2, the limiting means 22 of the present invention 10 may comprise a spherical limiting boss 32 having a transverse aperture directed therethrough which can be positioned over the fishing line 20 and crimped or clamped thereto. Alternatively, and as shown in FIGS. 5 and 6, the limiting means 22 may comprise a substantially U-shaped limiting member 34 having spaced and unlabelled ends positionable into an abutting orientation relative to the fishing line 20 such that the clasp 18 is positioned between the spaced ends of the U-shaped limiting member 34. A pair of end caps 36 are each securable to an individual one of the ends of the U-shaped limiting member 34 so as to secure the limiting member to the fishing line 20, whereby the line clasp 18 is secured between the ends and limited in its movement relative to the fishing line 20.

In use, the fishing line bobber 10 according to the present invention can be easily utilized to support a fishing line 20 and associated hook and lure at a desired depth within a body of water. The present invention 10 is designed to be easily casted a desired distance from a fishermen to a point in the water remotely located therefrom.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing line bobber comprising:

a spherical floatation member;

a hollow hemi-spherical weight secured to a portion of the spherical floatation member so as to coextensively cover approximately one-half of the spherical floatation member;

a swivel pivotally mounted adjacent a center of the hollow hemi-spherical weight;

a line clasp secured to the swivel and adapted for engaging a fishing line.

2. The fishing line bobber of claim 1, wherein the spherical floatation member is shaped so as to define a through-extending cylindrical bore of a first diameter extending through the spherical floatation member; and further comprising a center wire extending through a center of the spherical floatation member.

3. The fishing line bobber of claim 2, wherein the spherical floatation member is shaped so as to define a truncated cylindrical bore extending into the spherical floatation member which is of a second diameter, the truncated cylindrical bore being in contiguous communication with the through-extending cylindrical bore, with the second diameter being greater than the first diameter; and further comprising a securing boss received within said truncated cylindrical bore, the center wire projecting through the securing boss and through the through-extending cylindrical bore, the center wire being shaped so as to define an upper J-shaped end which engages a portion of the securing boss so as to preclude a passage of said upper end of the center wire through the through extending cylindrical bore of the spherical floatation member, the center wire continuing through the through-extending cylindrical bore of the spherical floatation member and projecting through said center of the hemi-spherical weight, the center wire terminating in a lower J-shaped end which engages an exterior portion of the hemi-spherical weight so as to secure the weight relative to the spherical floatation member.

4. The fishing line bobber of claim 3, wherein the swivel is engaged to the lower J-shaped end of the center wire.

5. The fishing line bobber of claim 4, in combination with a fishing line and limiting means, the line clasp being secured to the fishing line; and said limiting means secured to the fishing line for limiting travel of the line clasp along the fishing line.

6. The fishing line bobber in combination with a fishing line and limiting means of claim 5, wherein the limiting means comprises a spherical limiting boss having a transverse aperture directed therethrough, the spherical limiting boss being positioned over the fishing line and clamped thereto.

7. The fishing line bobber in combination with a fishing line and limiting of claim 5, wherein the limiting means comprises a substantially U-shaped limiting member having spaced ends positioned into an abutting orientation to the fishing line with the line clasp being positioned between the spaced ends of the U-shaped limiting member; and a pair of end caps, each of the end caps being secured to an individual one of the ends of the U-shaped limiting member so as to secure the limiting member to the fishing line, whereby the line clasp is secured between the ends and is limited in its movement relative to the fishing line.

* * * * *